April 15, 1952  H. H. WELSH ET AL  2,592,774
DOOR LATCHING AND LOCKING UNIT
Filed June 16, 1948  2 SHEETS—SHEET 1

INVENTORS.
HAROLD H. WELSH
GEORGE A. BESAW
BY Earl E. Moore

ATTORNEY

April 15, 1952     H. H. WELSH ET AL     2,592,774
DOOR LATCHING AND LOCKING UNIT
Filed June 16, 1948     2 SHEETS—SHEET 2

INVENTORS.
HAROLD H. WELSH
GEORGE A. BESAW
BY Earl E. Moore
ATTORNEY

Patented Apr. 15, 1952

2,592,774

UNITED STATES PATENT OFFICE 2,592,774

DOOR LATCHING AND LOCKING UNIT

Harold H. Welsh and George A. Besaw,
Los Angeles, Calif.

Application June 16, 1948, Serial No. 33,326

6 Claims. (Cl. 70—208)

This invention relates to a new and novel type of latching and locking unit which is expressly designed for vehicles and the like, but may have other uses wherever such a unit can be employed to advantage. The unit is especially suitable for automobile doors in that it provides a fool-proof and safety handle that is recessed into the outer surface of the door when not in use. New latching and locking principles are involved which are not found in other locking devices and these principles will subsequently become apparent.

Present automobile locks have handles which project outwardly and which are sometimes forced open by applying a pipe or some other lever means thereto, but the handle means of this invention cannot be so tampered with and damaged. This recessed handle feature also improves the stream lining appearances of the automobile sides and has a safety feature in that passing vehicles or other structures cannot strike it and be caught thereby.

One of the principal objects of this invention is to present a new and novel latching and locking device which is sturdy and simple in construction, a device which embodies a number of desirable features and which is economical to make and manufacture.

Other objects, advantages and features of this invention will appear from a perusal of the accompanying drawings, the subjoined detailed description, the preamble of these specifications, and the appended claims.

Figure 2:
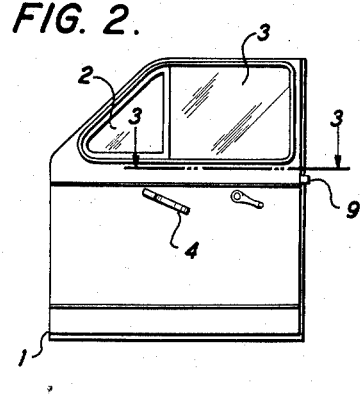
Fig. 2 is an elevational view of the other side of the door.
Figure 3:
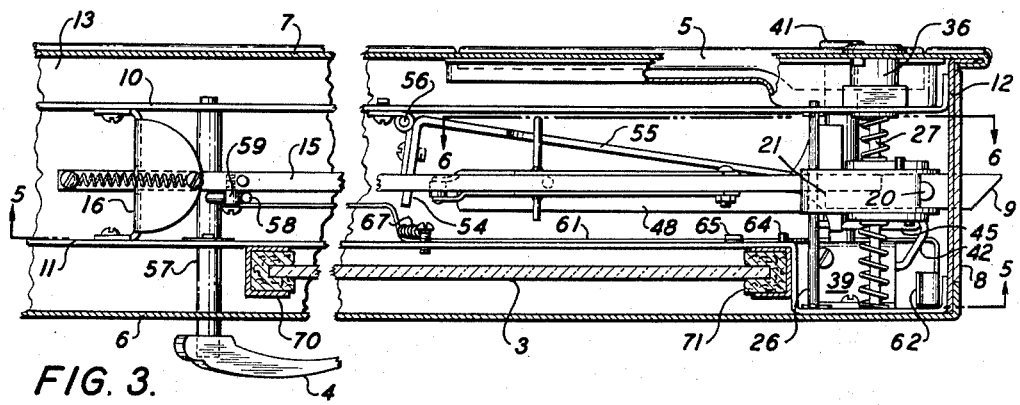
Figure 4:
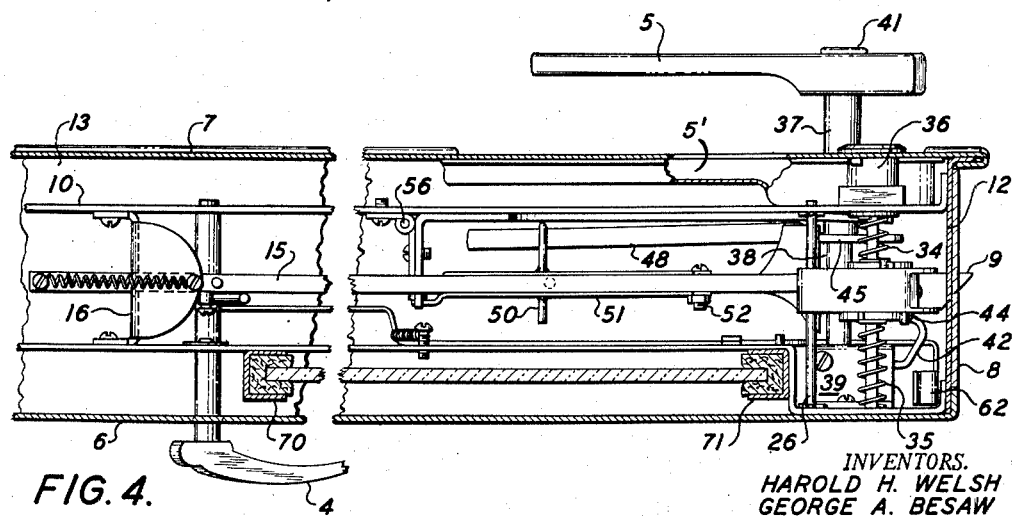
Figure 5:
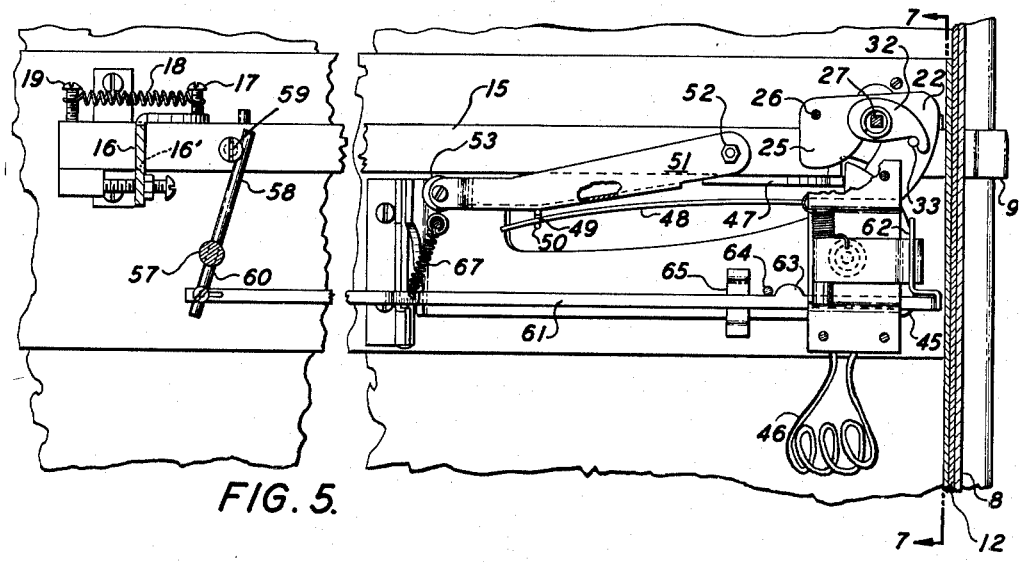
Figure 6:
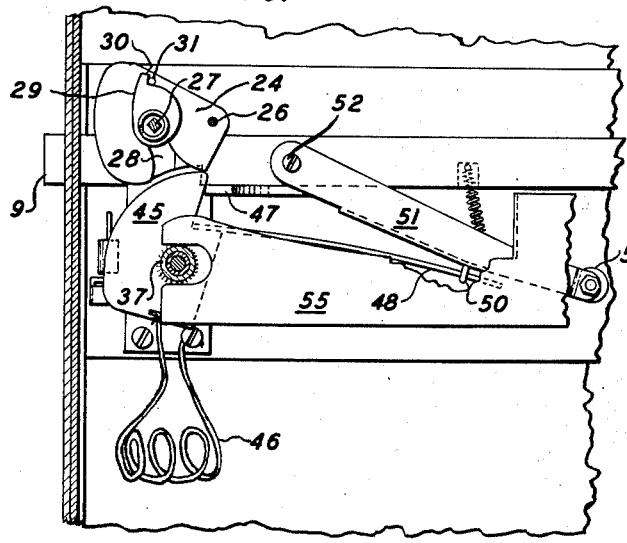
Figure 7:
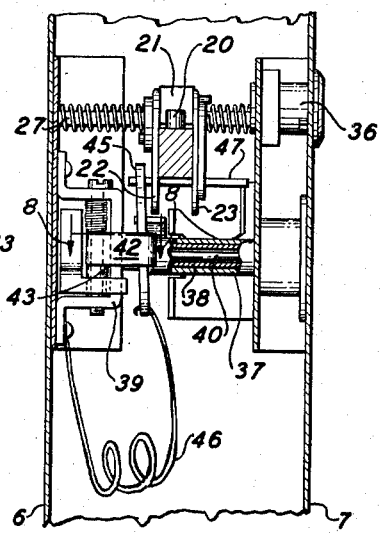

Fig. 3 is an enlarged horizontal sectional view taken substantially along the line 3—3 of Fig. 2; this view illustrating the positions of the various parts when the outside handle is recessed and locked by a key, Figure 4 is a view similar to that shown in Fig. 3, but shows the positions of the various parts when the outside handle is unlocked and released from its recessed position, Fig. 5 is a still greater enlarged view taken substantially along line 5—5 of Fig. 3, Fig. 6 is an enlarged view taken substantially along line 6—6 of Fig. 3, and Fig. 7 is an enlarged view taken substantially along line 7—7 of Fig. 5.

Figure 8:
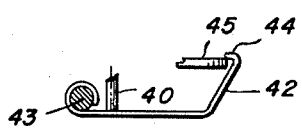

Figure 8 is a horizontal view with parts broken away, showing a detail of the invention.

Figure 1:
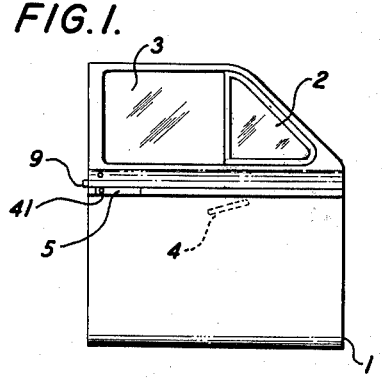
Fig. 1 is a general view, in elevation, of the side door of an automobile.

This particular form of the invention is applied to the side door of an automobile as indicated by the reference numeral 1 of Fig. 1. This door has the usual glass panels 2 and 3 and the inner and outer handles 4 and 5, respectively. Such doors have the inner shell or casing member 6 and an outer shell or casing member 7 which terminate at a jamb wall portion 8 which has a suitable aperture to accommodate the well known bevelled bolt end or tongue 9 that enters a keeper, not shown.

The mechanism of this invention is supported by a frame means having the side frame members 10 and 11 and the end frame member 12 which is fixed to the other frame members in any suitable manner such as riveting means, bolts, or welding; and this frame is shifted to the inner wall of the door in order to make room for the glass panel 3 to be dropped therebetween in the space 13.

The sliding bolt is indicated at 15 and it is supported at its forward end by the bottom of the apertures through the end plates 8 and 12, and at its rear end by the angle plate 16, the bolt passing through an aperture 16' thereof. This angle plate is supported by the walls 10 and 11, as shown, and to the top of this plate there is a stud 17 to which is fixed one end of a coiled tension spring 18, the other end of this spring being anchored to a stud 19 which is fixed to the end of the bolt. The head or tongue portion 9 of the bolt has a stop pin 20 behind which there is the dog 21 which has the side wings 22 and 23 which are spaced apart for sliding action along the sides of the bolt; these wings being integral with spaced side flanges 24 and 25 which are pivoted to a cross pin 26 that is supported by the side walls 10 and 11.

A shaft 27, having a square cross-section, is journalled in the side walls 10 and 11 and this shaft passes through the open slots 28 of the wings. On one side of the dog unit there is a cam 29 keyed to the shaft 27 which has the stop 30, and this cam guides a pin 31 which is fixed to a side wing of the dog unit so that when the shaft is rotated counterclockwise it releases the pin 31, but when rotated clockwise it raises the pin and the dog unit. On the other side of the dog unit there is another cam member 32 fixed to the shaft which works the pin 33 that is fixed to the wing 22 and forces the dog unit downwardly when rotated clockwise as shown in Fig. 4 so as to place the dog 21 behind the stop pin 20 and hence prevent inward movement of the bolt. Coiled compression springs 34 and 35 surround opposite portions of the square shaft 27 and maintain the cams against their respective sides of the dog unit. One end of the square shaft is coupled with the cylinder locking unit 36 and this shaft can be rotated only when the proper key is inserted in the locking unit.

The handle 5 is keyed to the tubular shaft 37 which rides upon a shaft member 38, these two shafts being journalled in the side walls 10 and 11, to wall 11, however, by virtue of the bracket means 39. The shaft 38 is hollow and has a plunger rod 40 therein which is free to reciprocate therein to a limited degree. This rod passes through both shafts and terminates into a button 41 which is adapted to be pressed by one's finger. The inner end of this rod makes contact with a spring member 42 (ribbon type) and this spring has one end anchored to a fixed post 43 and the other end bent to form a dog or detent 44.

Fixed to the shaft 37 there is a fin or operating plate 45 which has a helical spring 46 attached thereto and to a part of the bracket 39 and the purpose of this spring is to constantly urge the fin 45 in a right hand direction (as viewed in Fig. 7) regardless of the position thereof along the fixed shaft 38. Note, that the upper right hand edge of the fin 45 rides along the guide and cantilever plate 47, see Figs. 6 and 7. When the plate 45 is forced to the left, as shown in Fig. 7, the detent 44 is shoved to one side. A spring on the post 43 forces the detent into latching position with the plate. The top end of this fin makes contact with a guide and cantilever plate 47 which is fixed to the under portion of the bolt, this construction being provided so that the fin, or bolt mover, remains in operative connection with the bolt in either of its extreme transverse positions. Extending from this fin 45 there is an elongated curved band 48, the end of which rides in a slot of a member 50 which is secured to the underneath portion of a pivoted cantilever arm 51. This arm is pivoted to the bolt at 52 and has a roller 53 at the distal end thereof which normally makes sliding contact with a short arm 54 which is integral with a long arm 55, these arms being hinged to the wall 10 by the means 56.

The distal end of this long arm 55 is bifurcated so that it can remain in operative sliding contact with the outer surface of the shaft 37 and also engage the outer surface of the plate 45 so that when the bolt is forced rearwardly by operation of the inside handle 4, its shaft 57 and pin 58 thereof will work against the stud 59, thus the long arm 55 will swing to the position shown in Fig. 3 and force outer handle 5 into its recess 5'.

In order to lock the outer handle 5 against operation from the inside part of the door, the inner handle 4 need only be forced downwardly, this action rotating the shaft 57 and lever 60 which draws rod 61 and causes its looped end 62 to block action of the spring member 42 so that the button 41 is inoperative for release of the handle 5.

*Operation.*—As shown in Fig. 3 of the drawings, the outside handle 5 is in its inward position or in its inoperative position and the inside handle 4 is in normal position, that is, this inside handle is in a position to be lifted in order to draw the bolt and also in a position to be pushed downwardly in order to lock and prevent operation of the button 41. This locking of the button 41 is accomplished by pushing the handle 4 downwardly and this action pulls the rod 61 and its offset end 62 which is forced behind the spring member 42 so that this member cannot be forced toward the inside wall 6 for the purpose of releasing the dog end 44 thereof from the edge of the plate 45. The release of this plate 45 allows the outside handle to move outwardly through action of the spring 46. But with the inside handle in the position shown in Fig. 3, the spring-dog member 42 is not blocked, therefore, the outside handle can be released by pushing the button 41. By pushing this button 41, the inner rod 40 is forced inwardly and the distal end thereof pushes the spring member 42 near its fixed end and this releases the dog 44 from the edge of the plate 45. This action allows the plate and the outer shaft 37 to move toward the outer side of the door and thus carry this handle to its outermost position. The spring 46 forces the plate 45 to the right from the position shown in Fig. 7.

By manually forcing the inside handle 4 upwardly from the position shown in Fig. 4, the pin 58 of the shaft 57 draws the bolt inwardly by pressure upon the bolt's stud 59; and this action not only draws the bolt inwardly, but through the action of lever 51, and its end roller 53, against the short arm of the hinged member 56, the long arm 55 is swung to the position shown in Fig. 3 and the distal end thereof forces the plate 45 and the outer handle 5 to retreat into the recess of the car wall in the event this handle is in its outer position. Thus, an occupant in the car can unlatch the door and/or cause the outer handle to retreat into its pocket or recess 5'.

The locking means 36 and its associated parts are believed to be easy to understand from the specific description in the specification.

Guides 70 and 71 are shown positioned for accommodating the window glass or panel 3 in the event it is desired to place the panel in this position instead of in the position of space 13.

It is, of course, understood that various changes and modifications may be made in the details of form, style, design, and construction of the whole or any part of the specifically described embodiment of this invention without departing from the spirit thereof; such changes and modifications being within the scope of the following claims.

We claim:

1. In a locking device for automobile doors and the like, inner and outer wall members spaced apart for supporting the device, a sliding bolt with means supporting it between the wall members, a hollow shaft extending inwardly through one of the wall members, a handle fixed to an outer end of the shaft, a hollow tube supported by the other wall member and which telescopes the hollow shaft to provide a support for it and also provide a guide means therefore, an operating plate fixed to an inner end of the hollow shaft, a guide plate fixed to the bolt which has an edge along which rides a portion of the operating plate, a spring operable detent fixed near one of the wall members which is adapted to engage the operating plate, spring means attached to the operating plate and which constantly urges it toward the outer wall member, a recess in the handle with a button therein, a rod extending from the button and attached thereto and which passes through the tube and which has an end for making contact with the detent to release it from the operating plate when latched thereto and thus release the handle for outward movement.

2. The locking device recited in claim 1 wherein an arm is pivoted to the outer wall member and has a long portion and short portion at substantially right angles, the long portion having its distal end embracing the shaft and slidable therealong for shifting the operating plate and drawing the handle toward the outer wall member, a push rod attached to the bolt and having means at its distal end for forcing the short portion of the arm rearwardly when the bolt is shifted in a rearward direction.

3. The locking device recited in claim 1 wherein an outer finished wall is spaced from the outer wall which aids in supporting the device, said outer finished wall having a recessed housing chamber sized to snugly receive the handle so that the outer surfaces of the handle is flush with the outer surface of the outer finished wall.

4. The locking device recited in claim 1 wherein a second handle is pivoted to another wall of the device, means connecting the second handle with the bolt for operating it, and means extending from the second handle which is shiftable and adapted to block action of the detent means.

5. In a handle operating device for automobile doors, a supporting frame comprising a pair of spaced apart upright walls, an outside wall parallel with the frame walls and which outside wall has a handle recess portion therein which opens outwardly, a bore in the outside wall opening into the recess portion, a hollow shaft passing through the bore and having a handle fixed to its outer end, a bore in the handle, a push rod in the shaft and having an end thereof in the bore of the handle, catch plate means fixed to the inner end of the shaft, means to latch the plate in its innermost position, a shaft with an inner handle on the other side of the frame, a reciprocable bolt supported by the frame, means connecting the inner handle with the bolt for moving it, and means connecting the inner handle with the plate for moving it and forcing the outer handle into its recess.

6. In a locking device for automobile doors etc., inner and outer door walls spaced apart and which provides a chamber, inner and outer wall members spaced apart and arranged in the chamber for supporting the locking device, a reciprocally sliding bolt with means for supporting it between the wall members, a hollow shaft extending inwardly through the outer walls and having a handle fixed to the outer end thereof but the inner end of the shaft being short of the inner wall member, a hollow tube supported by the inner wall member and which telescopes the hollow shaft to provide a bearing support for it and also provide a guide means therefore, an operating plate fixed to an inner end of the hollow shaft, a guide plate fixed to the bolt which has an edge along which rides a portion of the operating plate, a spring operable detent means fixed near the inner wall member which is positioned to engage the operating plate, spring means attached to the operating plate for constantly urging it toward the outer wall member, a button in the handle at the outer end of the shaft, rod means extending from the button and fixed thereto and which rod means passes through the tube and which has an end for making contact with the detent means to release it from the operating plate when latched thereto so as to release the handle for automatic outward movement and thus positioned for use.

HAROLD H. WELSH.
GEORGE A. BESAW.

REFERENCES CITED

The following references are of record in the file of this patent:

UNITED STATES PATENTS

| Number | Name | Date |
| --- | --- | --- |
| 1,231,135 | Dempsey | June 26, 1917 |
| 2,120,647 | Papst | June 14, 1938 |
| 2,176,969 | Johns | Oct. 24, 1939 |
| 2,496,737 | McCallick et al. | Feb. 7, 1950 |

FOREIGN PATENTS

| Number | Country | Date |
| --- | --- | --- |
| 438,933 | Great Britain | Nov. 26, 1935 |